UNITED STATES PATENT OFFICE.

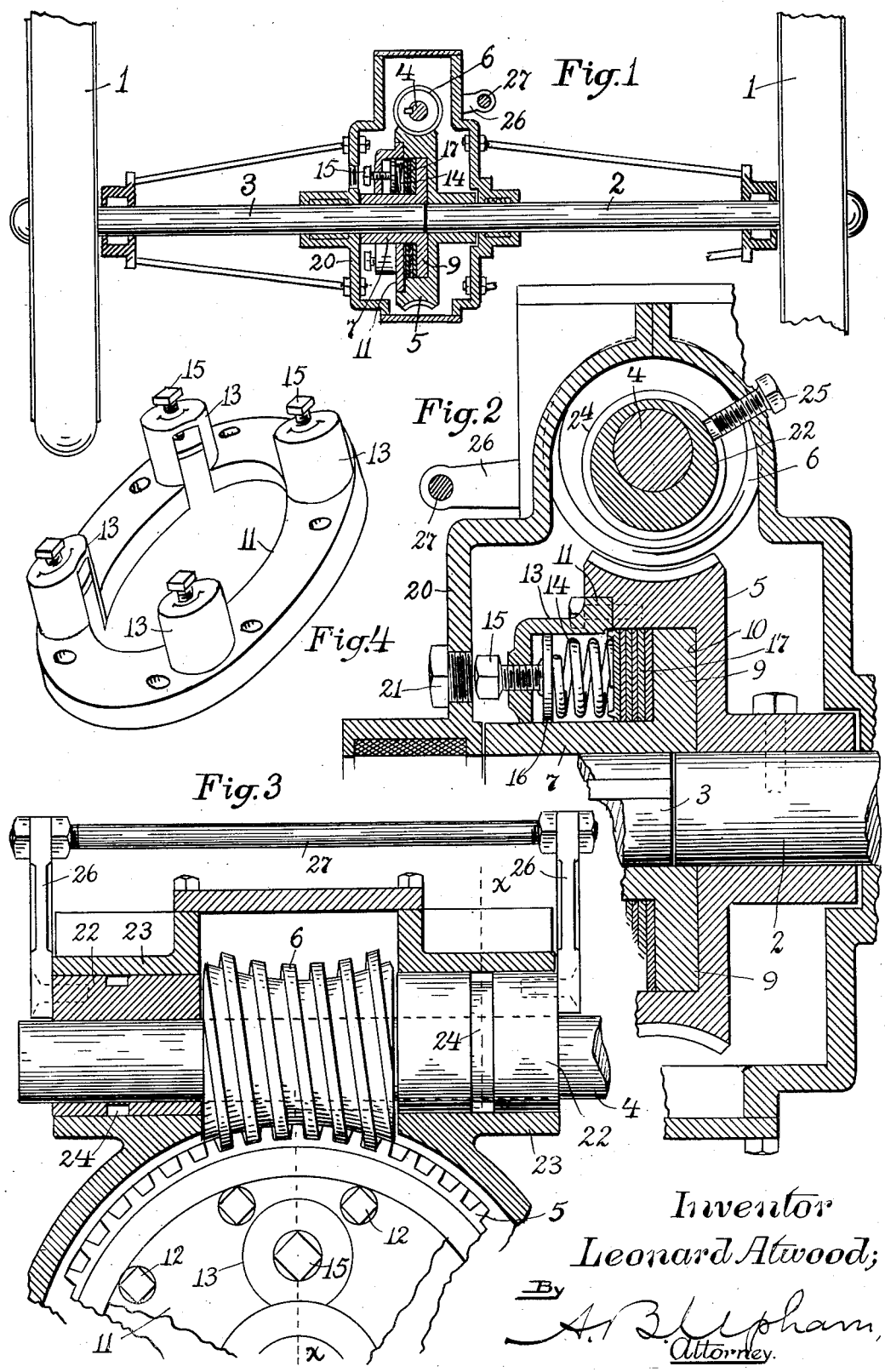

LEONARD ATWOOD, OF BOSTON, MASSACHUSETTS.

REAR-WHEEL TRANSMISSION.

1,322,392.     Specification of Letters Patent.     Patented Nov. 18, 1919.

Application filed November 29, 1918. Serial No. 264,503.

*To all whom it may concern:*

Be it known that I, LEONARD ATWOOD, a citizen of the United States, and a resident of the city of Boston, in the county of Suffolk and Commonwealth of Massachusetts, have invented certain new and useful Improvements in Rear-Wheel Transmissions, of which the following is a full, clear, and exact specification.

This invention has for its object the construction of a rear wheel drive for automobiles, motor trucks and the like which shall lessen the danger of skidding, which can be used as an absolute brake in case the usual friction brakes for any reason become inoperative, and which shall also be simpler and less expensive to manufacture, and more durable and reliable in use.

To this end my invention consists essentially in providing the two alined shaft-sections rigid with the drive wheels, with a friction clutch connection and means for driving one of the sections, the friction connection permitting the two wheels to have unequal travel in rounding a curve.

The brake function is performed by having a worm drive of so slow a pitch that the drive wheels cannot turn the engine shaft, so that the car must stop whenever the engine comes to rest.

In the drawings forming part of this specification, Figure 1 is a rear elevation of the drive wheels of an automobile or motor truck showing my improved drive in section as applied thereto. Fig. 2 is a detail sectional elevation of the drive on a larger scale. Fig. 3 is a transverse sectional view. Fig. 4 is a perspective view of a portion of one of the parts of the drive.

The reference numeral 1 designates the two drive wheels of a motor car; 2, 3 are the axles each rigidly attached to its respective wheel, and 4 is the drive shaft suitably connected with an engine, motor or other prime mover. Upon the axle 2 is mounted a worm gear 5 designed to be engaged by a worm 6 keyed upon the drive shaft 4 for the forcible rotation of the drive wheel 1 attached to the axle 2. For turning the other wheel 1 a sleeve 7 is keyed or otherwise mounted upon the axle 3, this sleeve being formed with a flange 9 fitting against a radially disposed surface 10 within the hollow worm gear 5.

To provide a friction drive between the gear 5 and the flange 9, the recess within the hollow gear is covered by an annular plate 11 suitably fastened thereto, as by bolts 12. This annular plate is formed with several cylindrical bosses 13 within each of which is located a heavy helical spring 14 pressed toward the flange 9 by an adjusting screw 15 acting through a disk 16. Between the plate 11 and the flange are two or more thin rings 17 acted against by the springs 14. By screwing these bolts 15 in more firmly, a sufficient degree of friction between the rings 17 and the flange 9 is reached to cause the shaft 3 and its wheel 1 to be forcibly rotated with the worm gear 5.

When, now, the car rounds a curve, the friction rings slip and permit the two drive wheels to rotate unequally. By thus providing a friction drive between the two wheels, instead of the customary differential, the danger of the car's skidding is very largely avoided; for I have discovered that the most dangerous form of skidding, that where the car turns completely about, as well as the more simple kinds of skidding, is caused by the action of the differential in forcing one wheel to receive a reverse rotation when the other wheel meets any obstruction to its motion.

With my friction drive, on the other hand, if the positively driven wheel meets an obstruction, such as a quantity of deep sand or loose gravel, the engine forces it to turn without change until the car has been carried through and past the same. If the positively driven wheel makes several rotations in the sand or gravel with but a slight advancement of the car, the friction-driven wheel being for example on good going, the friction drive of the latter will slip instead of causing skidding or other troubles.

To permit of the screws 15 being adjusted for varying the tension on the springs 14, I provide the gear case 20 with an opening closable in any suitable way, as by a screw plug 21.

As shown in Fig. 3, the worm 6 has its threads formed with a comparatively slow drive so that it is impossible for the drive wheels to force the engine shaft to turn. Hence, by slowing up the engine or stopping it altogether, the car is thereby correspondingly controlled.

To enable the car to be towed, should any engine troubles develop, I provide means for unshipping the worm from its engagement with the worm gear, the same comprising an eccentric bushing 22 at each side of the worm 6 in the bearing boxes 23. An annular groove 24 in each bushing, and a set screw 25 entering it serve to retain the bushings in place. An arm 26 is attached to each bushing, and a rod 27 joins the two arms, whereby a swing applied to the rod about the shaft 4 as a center causes the latter and the worm 6 thereon to advance into mesh with, or to recede from, the worm gear 5. When thus disengaged, the engine is not affected by the rotation of the drive wheels, and the car can be freely towed or pushed wherever desired.

Not only does this gear wheel transmission greatly decrease the danger of skidding and other accidents; and permit of automatic and absolutely positive braking, but the entire construction is comparatively inexpensive, durable and not liable to get out of order.

The action of this friction drive is entirely different from the ordinary geared differential motion, inasmuch as the power applied thereby causes the drive wheels both to rotate in one direction; whereas by the use of gears employed in the differential, the motion is reversed, one wheel being made to rotate in a direction opposite to that of the other while the drive shaft continues its motion without interruption. In other words, one wheel runs clock-wise, while the other turns anticlock-wise.

Consequently, when one wheel becomes suddenly stuck or otherwise its forward progress is interfered with, the other wheel is thereby caused to reverse its direction and the car may be made, as is so often the case, to turn entirely about on a vertical axis and to put its occupants into grave danger of collision, turning turtle and other accident.

With my friction drive, on the other hand, there is absolutely no danger of such a cause of accident, since both wheels are always given a motion in the same direction, and neither can give a reverse motion to the other.

What I claim is:

1. A drive comprising a drive shaft, two independent drive wheel axles, means for enabling the drive shaft to positively drive one of said axles, and a friction drive between said axles which permits the two wheels to rotate independently of each other to any extent but against the resistance given by the friction.

2. A drive comprising a drive shaft, two independent drive wheel axles in alinement, a gear fast on one of the axles, means for communicating power from the drive shaft to said gear, and a friction drive between said gear and the other axle.

3. A drive comprising a drive shaft, two independent drive wheel axles in alinement, a chambered gear fast on one of said axles, a flange rigid on the other axle fitting within said chambered gear, and means for applying a yielding pressure between said flange and gear, and driving the gear.

4. A drive comprising a drive shaft, two independent drive wheel axles in alinement, a chambered gear fast on one of said axles, a flange rigid on the other axle fitting within the chambered gear, a friction disk resiliently pressed against said flange, and means for communicating power from said shaft to said gear.

5. A drive comprising a drive shaft, two independent axles in alinement, a chambered gear fast on one of said axles, means for communicating power from said shaft to said gear, a plate fastened to said gear and inclosing its chamber, the plate having a plurality of hollow bosses, a plurality of friction rings between said plate and gear, a helical spring within each boss bearing against said friction rings, and a set screw for applying tension to each spring, and a flange located between said friction rings and the wall of the chambered gear rigid with the other axle than the one carrying said gear.

In testimony that I claim the foregoing invention, I have hereunto set my hand this 2nd day of November, 1918.

LEONARD ATWOOD.